United States Patent
Lutz

(10) Patent No.: US 9,028,333 B2
(45) Date of Patent: May 12, 2015

(54) SHAFT FOR TRANSMITTING TORQUES

(75) Inventor: Guenther Lutz, Aldrans (AT)

(73) Assignee: Hackforth GmbH, Herne (DE)

( * ) Notice: Subject to any disclaimer, the term of this patent is extended or adjusted under 35 U.S.C. 154(b) by 0 days.

(21) Appl. No.: 13/820,833

(22) PCT Filed: Sep. 5, 2011

(86) PCT No.: PCT/EP2011/004457
§ 371 (c)(1),
(2), (4) Date: Jun. 14, 2013

(87) PCT Pub. No.: WO2012/031730
PCT Pub. Date: Mar. 15, 2012

(65) Prior Publication Data
US 2013/0267333 A1  Oct. 10, 2013

(30) Foreign Application Priority Data
Sep. 6, 2010 (DE) .......................... 10 2010 044 464

(51) Int. Cl.
*F16D 1/076* (2006.01)
*F16C 3/02* (2006.01)

(52) U.S. Cl.
CPC ................ *F16C 3/026* (2013.01); *F16D 1/076* (2013.01)

(58) Field of Classification Search
USPC ............... 464/181–183; 403/336, 337, 408.1; 285/390, 392, 412
See application file for complete search history.

(56) References Cited

U.S. PATENT DOCUMENTS

| | | | | |
|---|---|---|---|---|
| 2,879,092 A | * | 3/1959 | Grobel et al. | 403/337 |
| 4,380,443 A | * | 4/1983 | Federmann et al. | 464/181 |
| 4,747,806 A | * | 5/1988 | Krude et al. | 464/182 |
| 4,758,109 A | * | 7/1988 | Little et al. | 403/337 X |
| 5,665,187 A | | 9/1997 | Mackellar | |
| 8,291,678 B2 | * | 10/2012 | William | 403/337 X |

FOREIGN PATENT DOCUMENTS

| | | |
|---|---|---|
| DE | 40 09 031 A1 | 9/1991 |
| DE | 297 08 324 U1 | 7/1997 |
| EP | 0 385 839 A1 | 9/1990 |
| WO | WO 2009/144484 A2 * | 12/2009 |

OTHER PUBLICATIONS

International Search Report of PCT/EP2011/004457, Jan. 25, 2012.

* cited by examiner

*Primary Examiner* — Gregory Binda
(74) *Attorney, Agent, or Firm* — Collard & Roe, P.C.

(57) ABSTRACT

A shaft for transmitting torques includes a hollow shaft made of fiber-reinforced plastic. A flange which can be used to connect the hollow shaft to a driving or driven machine part is fastened at least to one end of the hollow shaft. The flange is fastened to the hollow shaft via a number of screw connections. Each screw connection includes a screw and a nut. The shank of the screw projects in the direction of the hollow shaft through an opening in the flange that is arranged in the connection region between the end edge of the hollow shaft and the flange. The shank extends at least partially inside the shell of the hollow shaft and engages with the nut arranged on the hollow shaft. The head of the screw is supported on that side of the flange opposed to the hollow shaft.

18 Claims, 4 Drawing Sheets

SHAFT FOR TRANSMITTING TORQUES

CROSS REFERENCE TO RELATED APPLICATIONS

This application is the National Stage of PCT/EP2011/004457 filed on Sep. 5, 2011 which claims priority under 35 U.S.C. §119 of German Application No. 10 2010 044 464.2 filed on Sep. 6, 2010, the disclosure of which is incorporated by reference. The international application under PCT article 21(2) was not published in English.

BACKGROUND OF THE INVENTION

1. Field of the Invention

The invention relates to a shaft for transmitting torques, comprising a hollow shaft made of fiber-reinforced plastic, wherein a flange which can be used to connect the hollow shaft to a driving or driven machine part is fastened at least to one end of the hollow shaft.

The invention furthermore relates to a shaft for transmitting torques, comprising at least two single-end connected hollow shafts linked to each other via at least one flange, said hollow shafts made of fiber-reinforced plastic and arranged coaxially to the longitudinal axis of the shaft.

2. Description of the Related Art

A shaft of this type is disclosed, for example, in DE 297 08 324 U1. The hollow shaft is connected via radial bolts to a flange sleeve section concentric to the hollow shaft rotation axis, there being a radial passage bore arranged both in the hollow shaft and in the sleeve section. As compared with conventional shafts, entirely formed of metal, this shaft has a relatively low weight. Nevertheless, the hollow shaft features good strength properties and good fatigue behavior. Such a shaft is particularly suitable for use in shipbuilding, for example.

SUMMARY OF THE INVENTION

It is an object of the present invention to provide a novel shaft for transmitting torques which has less weight and can be produced in a more cost-effective manner than conventional shafts whilst maintaining hitherto known shaft robustness.

This task is fulfilled by a shaft for transmitting torques of the afore-mentioned type in such a manner that the flange be fastened by means of a plurality of screw connections to the end edge of one end of the hollow shaft, wherein each screw connection comprises a screw and a nut, wherein the shank of the screw projects in the direction of the hollow shaft through an opening in the flange that is arranged in the connection region between the end edge of the hollow shaft and the flange, and extends at least partially inside the shell of the hollow shaft and engages with the nut arranged on the hollow shaft, and wherein the head of the screw is supported on that side of the flange opposed to the hollow shaft.

With the inventive shaft, the flange which is preferably made of a metallic material, a fiber composite or a thermoplastic material is not connected via a concentric sleeve section to the hollow shaft as known, for example from DE 297 08 324 U1. Such a concentric sleeve section is inventively not required. In accordance with the invention, the flange can basically be a plain-configured shaft. Hence the flange and thus the entire shaft have a weight that is noticeably reduced as compared with conventional shafts. Furthermore, it is not required to arrange any radial bores in the concentric sleeve section made of metal as required in prior art. Thereby, the production of the inventive shaft is associated with a noticeably less manufacturing expenditure. Moreover, both advantages lead to cost savings in production of the inventive shaft.

The shank of the screw inventively projects in the direction of the hollow shaft through an opening in the flange that is arranged in the connection region between the end edge of the hollow shaft and the flange, and extends at least partially inside the shell of the hollow shaft. The latter means that the shank of the screw extends inside the material of the hollow shaft shell, with the shell having a certain shell thickness suitable for the relevant purpose of application of the hollow shaft. For example, the shank of the screw is arranged in parallel and at certain spacing to the longitudinal axis of the hollow shaft. Alternatively, the shank of the screw can also be aligned at a certain angle versus the longitudinal axis of the hollow shaft. The angle is arranged in a plane aligned vertically to the radial distance of the screw shank towards the longitudinal axis of the hollow shaft. To obtain ideal transmission of shear forces, choosing a ±45° angle between the screw shank and the longitudinal axis of the hollow shaft is advantageous, with the choice of the sign being dependent on the relevant sense of rotation of the shaft.

In accordance with an advantageous embodiment of the invention, the screw of at least one screw connection is configured as an expansion bolt. An expansion bolt can absorb temporally alternating loads by means of primarily elastic deformation of its shank. The screw of each screw connection is preferably configured as an expansion screw.

In another advantageous embodiment of the invention, it is provided for that the nut of at least one screw connection is configured as a crossway bolt with a female thread, said bolt being arranged in a radial bore on the hollow shaft. To manufacture the shaft, the crossway bolt can be arranged in the radial bore which may also be configured as a passage bore, whereupon the bolt can be screwed into the female thread on the crossway bolt. For example, the crossway bolt may be cylindrical, with the cylinder axis preferably being arranged radially to the longitudinal axis of the hollow shaft.

Alternatively it is proposed providing one crossway bolt with a passage bore without female thread in addition to the screw and nut, said crossway bolt being arranged in a radial bore on the hollow shaft. The cross-section of the radial bore on the hollow shaft in this case may be elliptical. The nut of the screw connection supports itself on that side of the crossway bolt which is averted from the flange.

In accordance with another advantageous embodiment of the invention, the end of the hollow shaft is additionally linked in a material-to-material connection to the flange fastened to it. Preferably the material-to-material connection is given by adhesive bonding, utilizing an epoxy resin or an anaerobic adhesive system. Providing a material-to-material connection between the flange and hollow shaft substantially benefits the properties of the shaft for transmitting torques concerning its robustness and the level of the transmittable torque. Usable as epoxy resin, for example, is a two-component epoxy resin.

Furthermore it is proposed that the end of the hollow shaft be connected in a positive-lock connection to the flange fastened to it. In the exemplary case of a flange made of steel, a positive-lock connection can be established as a micro-positive lock connection, for example, by knurling the steel flange or by applying a different method for roughening the contact surface of the steel flange with the end edge of the hollow shaft.

The afore-mentioned object and task is furthermore solved by means of a shaft of the second a.m. type in such a manner that the hollow shafts are connected to each other by means of a plurality of screw connections, wherein each screw connection comprises a screw and a nut, wherein the head of the screw is arranged in a radial bore in the first hollow shaft, and wherein the shank of the screw mainly extends at the flange inside the shells of the hollow shafts and through an opening arranged with the flange in the connecting range of the end edges of the ends facing each other of the hollow shafts with the flange and engages with the nut arranged in a radial bore at the second hollow shaft.

This inventive shaft can be produced with less weight and in a more cost-effective manner than conventional shafts, because the flange arranged between them can be reduced to a minimal size. For example, the flange is of a circular and plain shape, with its ring width roughly corresponding to that of the likewise circular end edge of one end of either hollow shaft. These substantial savings of mass in the connecting region of the two hollow shafts lead to a desirable reduction of the bending natural frequency of the entire shaft.

Here, too, the feature that the shank of the screw mainly extends inside the shells of both hollow shafts implies that the shank of the screw extends inside the material of the shell of both hollow shafts, with the shells having a distinct shell thickness suitable for the relevant intended purpose of the shaft. For example, the shank of the screw is arranged in parallel and at certain spacing to the longitudinal axis of the shaft. Alternatively, the shank of the screw may also be aligned at a certain angle to the longitudinal axis of the shaft. Here, the angle is arranged in a plane aligned vertically to the radial distance from the screw shank to the longitudinal axis of the shaft. To obtain ideal transmission of shear forces, choosing a ±45° angle between screw shank and longitudinal axis is advantageous, with the choice of the sign being dependent on the relevant sense of rotation of the shaft.

In accordance with an advantageous embodiment of the invention, the screw comprises an expansion bolt encompassing the shank and a crossway bolt forming the head, wherein the crossway bolt is fastened to the expansion bolt. The expansion bolt can absorb temporally alternating loads by means of primarily elastic deformation. Preferably, the crossway bolt is cylindrical in shape, wherein the cylinder axis is preferably arranged radially to the longitudinal axis of the shaft. Preferably the outer contour of the crossway bolt corresponds to the inner contour of the radial bore.

Another advantageous embodiment of the invention provides for that at least one screw connection comprises a crossway bolt with a passage bore, said crossway bolt being arranged in a radial bore on the second hollow shaft and wherein the nut supports itself on the side averted from the first hollow shaft. Preferably the radial bore on the second hollow shaft is configured as an oblong hole.

In accordance with another advantageous embodiment of the invention, the end edges of the hollow shafts facing each other are linked in a material-to-material connection to the flange. Preferably, the material-to-material connections are established by adhesive bonding, utilizing an epoxy resin or an anaerobic adhesive system. This is associated with the advantages outlined hereinabove.

According to another advantageous embodiment of the invention, the end edges of the hollow shaft ends facing each other are linked in a positive-lock connection to the flange. Preferably, the flange is made of steel and the positive-lock connections are configured as micro-positive lock connections established by knurling or by means of applying any other method for roughening the flange.

It is furthermore deemed advantageous for the flange to comprise two equally configured and coaxially arranged flange parts, wherein the first hollow shaft is connected to a first flange part and the second hollow shaft being connected to the second flange part. Preferably the two flange parts are linked to each other in a positive-lock arrangement.

BRIEF DESCRIPTION OF THE DRAWINGS

Other characteristic features of the invention are elucidated in the following by way of practical examples illustrated in the figures attached hereto for the inventive shaft for transmitting torques, wherein.

DETAILED DESCRIPTION OF THE PREFERRED EMBODIMENTS

Figure 1:
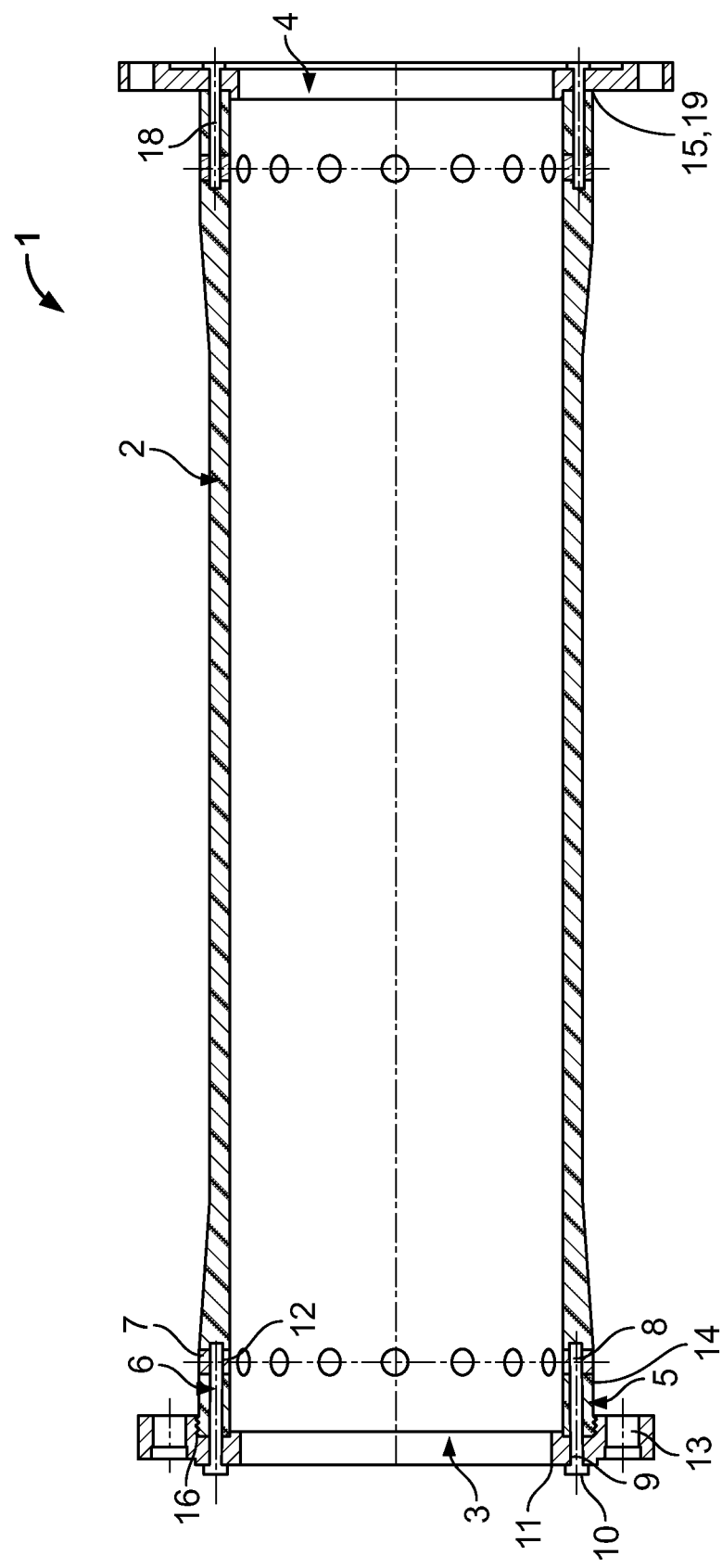
FIG. 1: shows a longitudinal section of a practical example for the inventive shaft.

FIG. 1 shows a longitudinal section through a practical example for the inventive shaft 1 for transmitting torques. Shaft 1 comprises a hollow shaft 2 made of fiber-reinforced plastic, at the ends of which a metallic and mainly plain-configured flange 3 and/or flange 4 is fastened to. Each flange 3 and/or flange 4 is fastened by means of a plurality of screw connections 5 to the hollow shaft 2.

Each screw connection 5 comprises a screw 6 and a nut 7. Shank 8 of screw 6 projects through an opening 9 in the relevant flange 3 and flange 4, respectively. Shank 8 is arranged in parallel and at certain spacing to the longitudinal axis A of the hollow shaft 2. Shank 8 extends at least partially inside the hollow shaft 2 and engages with the nut 7 arranged on the hollow shaft 2. The head 10 of screw 6 supports itself on the side 11 of the relevant flange 3 and/or 4, with the side 11 averted from the hollow shaft 2.

Screws 6 of the screw connections 5 are configured as expansion screws 18. Nuts 8 of the screw connections 5 are configured as crossway bolts with a female thread 14 and arranged each in a radial bore 12 on the hollow shaft 2. Alternatively, at least one screw connection 5 can be configured as a crossway bolt with a passage bore without female thread, at the side of which opposed to the flange 3 and/or 4 the nut 7 is supported.

Each end of the hollow shaft 2 is additionally glued by using a two-component epoxy resin or an anaerobic adhesive system to the flange 3 and/or 4 fastened to it. The epoxy resin or the anaerobic adhesive system acts as an adhesive 19 and is arranged between the end edge surfaces of the ends of hollow shaft 2 and the flanges 3 and 4, respectively. At its end areas, hollow shaft 2 and has a greater material thickness than in the middle area in order to increase robustness of the screw connections. In this embodiment, the adhesive bonding also acts as a frictional connection 15 of the hollow shaft 2 to the flange 3 and/or 4. In addition to an adhesive bonding, each end of the hollow shaft 2 is linked in a positive-lock connection to each flange 3 and/or 4 fastened to it. Flange 3 and 4 (or 101 or 102 shown in FIGS. 2 and 3) can be made of steel and the positive-lock connection can be configured as a mirco-positive lock, established by knurling/roughening 16 of the flange 3 and/or 4.

Flanges 3 and 4 have passage openings 13 via which the shaft 2 can be connected to driving or driven machine components.

Figure 2:
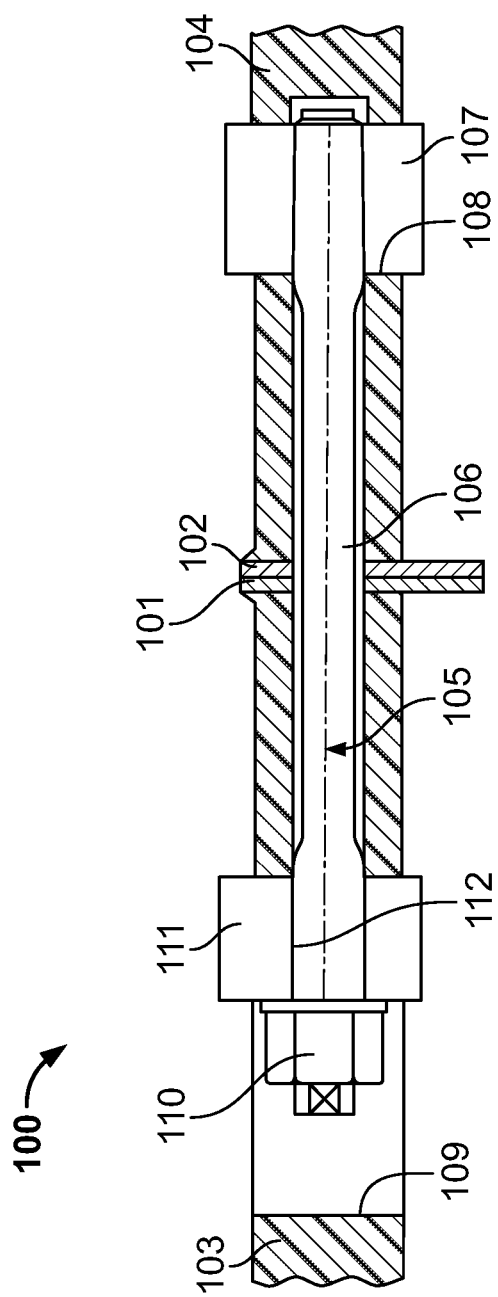
FIG. 2: shows an extract of another practical example represented in a longitudinal cross-section for the inventive shaft.
Figure 3:
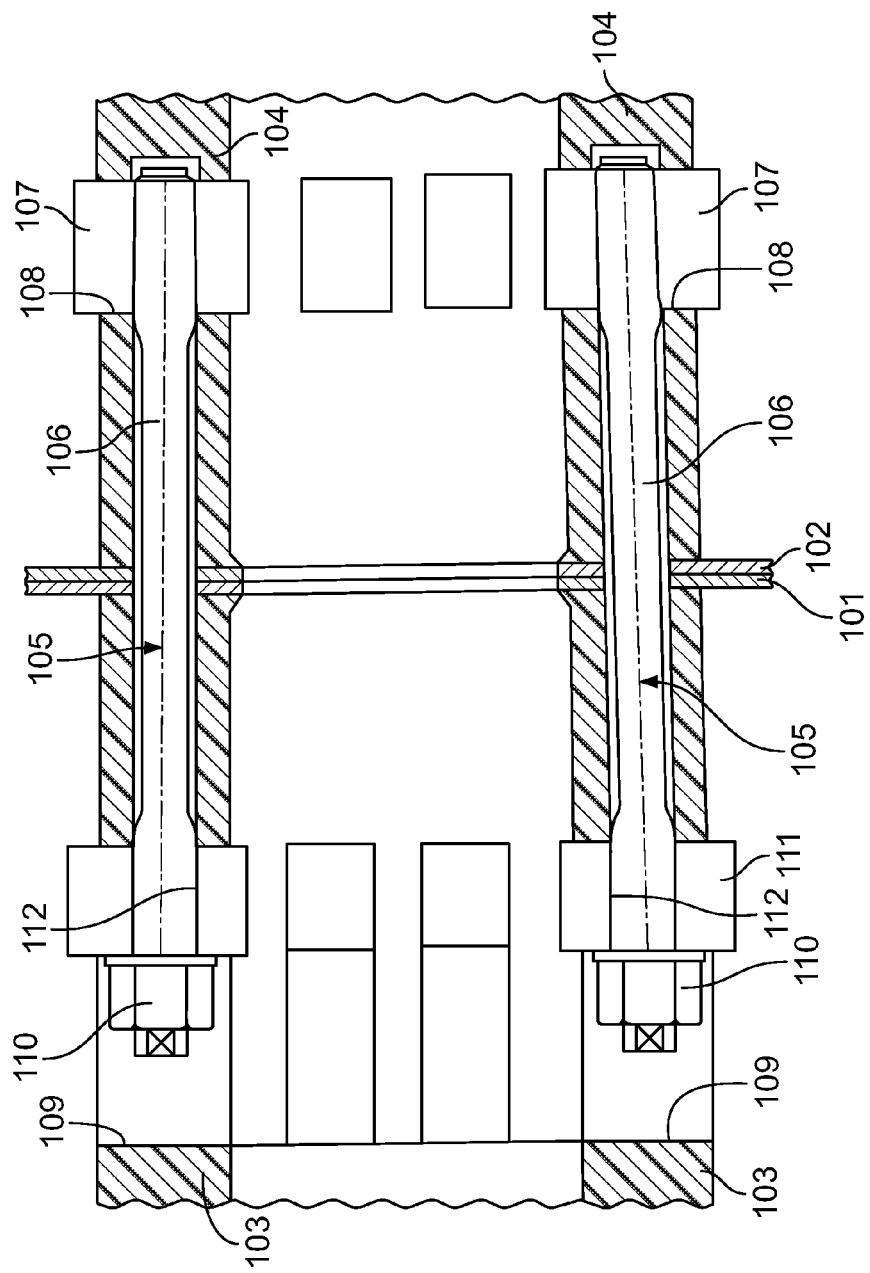
FIG. 3: shows the embodiment of FIG. 2 but in a viewpoint in which both lateral sides of each hollow shafts 103 and 104 are visible.
Figure 4:
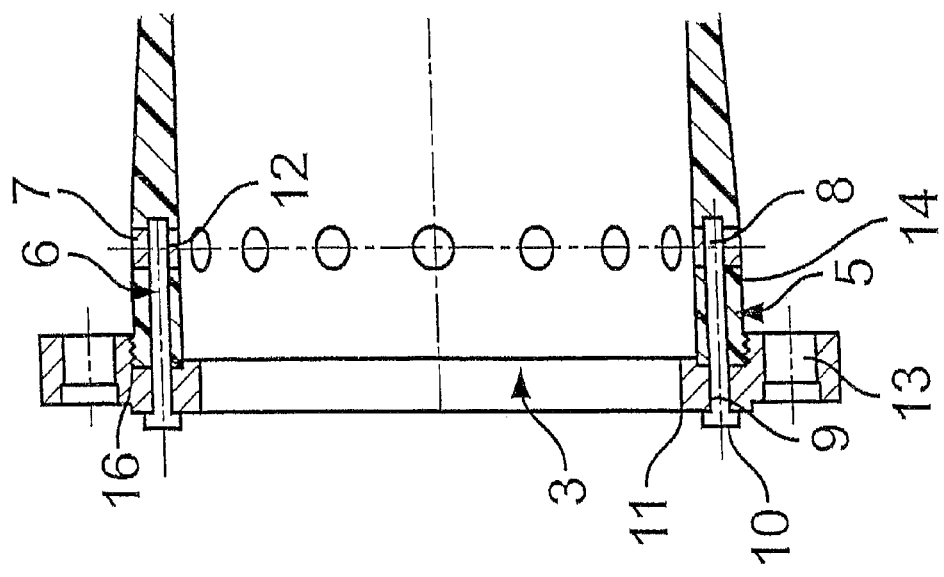
FIG. 4: shows an enlargement of a lower region of the example shown in FIG. 1 around flange 3.

FIGS. 2 and 3 show another practical example for the inventive shaft 100 for transmitting torques, with FIG. 2 showing a partial view of this example. Shaft 100 comprises two hollow shafts 103 and 104 made of fiber-reinforced plastic, the said hollow shafts single-ended connected to each other via the flange parts 101 and 102. The hollow shafts 103 and 104 are arranged coaxially to the longitudinal axis of the shaft 100. The hollow shafts 103 and 104 are connected to each other by means of a plurality of screw connections 105, thereof only one being illustrated in FIG. 2.

The screw connection 105 comprises a screw formed by an expansion bolt 106 encompassing the screw and a crossway bolt 107 forming the head. The crossway bolt 107 is fastened to the expansion bolt 106 and arranged in a radial bore 108 of the first hollow shaft 104. The shank of the screw which is formed by the expansion bolt 106 is arranged in parallel to and at certain spacing to the longitudinal axis of the shaft 100, and it extends inside the two hollow shafts 103 and 104 and it engages with the nut 110 of the screw connection 105, with the said nut being arranged in a radial bore 109 on the second hollow shaft 103, wherein the radial bore 109 on the second hollow shaft 103 is configured as an oblong hole aligned in longitudinal extension of the shaft 100. The screw connection 105 furthermore comprises a crossway bolt 111 with a passage bore 112. The nut 110 supports itself on the crossway bolt 111 side which is averted from the first hollow shaft 104.

The edge end of the end of the first hollow shaft 104, said edge end facing the second hollow shaft 103, is linked in a material-to-material and positive-lock connection to the first flange part 102. The end of the second hollow shaft 103 end facing the first hollow shaft 104 is linked in a material-to-material and a positive-lock connection to the second flange part 101. These positive-lock connections can be microform positive-lock connections established by knurling or any other method for roughening the flange parts 101 or 102. The material-to-material connections of shaft 103 to first flange part 101 or of shaft 104 to second flange part 102 can be given by adhesive bonding, utilizing an epoxy resin or an anaerobic adhesive system.

The flange parts 101 and 102 are equally configured and coaxially arranged. They are connected to each other in a positive-lock arrangement.

The practical examples described by way of the figures serve for explanatory purposes and are not restrictive.

The invention claimed is:

1. A shaft for transmitting torques, comprising:
   a hollow shaft made of fiber-reinforced plastic;
   wherein a flange which can be used to connect the hollow shaft to a driving or driven machine part is fastened at least to one end of the hollow shaft;
   wherein the flange is fastened to the front edge of one end of one end of the hollow shaft via a plurality of screw connections;
   wherein each screw connection comprises a screw and a nut;
   wherein the shank of the screw projects in a longitudinal direction of the hollow shaft through an opening in the flange that is arranged in the connection region between the end edge of the hollow shaft and the flange, and extends at least partially inside the material of the shell of the hollow shaft and engages with the nut arranged on the hollow shaft; and
   wherein the head of the screw is supported on that side of the flange opposed to the hollow shaft.

2. The shaft as defined in claim 1, wherein the screw of at least one screw connection is configured as an expansion screw.

3. The shaft as defined in claim 1, wherein the nut of at least one screw connection is configured as a crossway bolt with a female thread, said crossway bolt being arranged in a radial bore at the hollow shaft.

4. The shaft as defined in claim 1, wherein at least one screw connection comprises a crossway bolt with a passage bore without female thread, at the side of which opposed to the flange the nut is supported.

5. The shaft as defined in claim 1, wherein the end of the hollow shaft is frictionally connected to the flange fastened to it.

6. The shaft as defined in claim 5, wherein the material-to-material connection is given by adhesive bonding, utilizing an epoxy resin or an anaerobic adhesive system.

7. The shaft as defined in claim 1, wherein the end of the hollow shaft is positive-lock connected to the flange fastened to it.

8. The shaft as defined in claim 7, wherein the flange is made of steel and wherein the positive-lock connection is configured as a micro-positive lock, which is established by knurling or any other method for roughening the flange.

9. A shaft for transmitting torques, comprising:
   at least two hollow shafts made of fiber-reinforced plastic connected at one end or connected at least via a flange;
   wherein the said hollow shafts are arranged concentrically to a longitudinal axis of the shaft;
   wherein the end edges of the hollow shaft ends facing each other are connected to each other via the flange via a plurality of screw connections, forming a connecting range of the end edges;
   wherein each screw connection comprises a screw and a nut;
   wherein the head of the screw is arranged in a radial bore in the first hollow shaft; and
   wherein the shank of the screw mainly extends at the flange inside the material of the shells of the two hollow shafts and through an opening arranged with the flange in the connecting range of the end edges of the ends facing each other of the hollow shafts with the flange and engages with the nut arranged in a radial bore at the second hollow shaft.

10. The shaft as defined in claim 9,
    wherein the screw of at least one screw connection comprises an expansion bolt comprising the shaft and a crossway bolt forming the head;
    wherein the crossway bolt is fastened to the expansion bolt.

11. The shaft as defined in claim 9,
    wherein at least one screw connection comprises a crossway bolt with a passage bore, said bolt being arranged in the radial bore on the second hollow shaft; and
    wherein the nut is supported on the hollow shaft side opposed to the first hollow shaft.

12. The shaft as defined in claim 9, wherein the radial bore on the second hollow shaft is configured as an oblong hole.

13. The shaft as defined in claim 9, wherein the end edges of the hollow shaft ends facing each other are material-to-material connected to the flange.

14. The shaft as defined in claim 13, wherein the material-to-material connections are given by adhesive bonding, utilizing an epoxy resin or an anaerobic adhesive system.

15. The shaft according to claim 9, wherein the end edges of the hollow shaft ends facing each other are positive-lock connected to the flange.

16. The shaft as defined in claim 15,
wherein the flange is made of steel; and
wherein the positive-lock connections are configured as microform positive-lock connections established by knurling or any other method for roughening the flange.

17. The shaft as defined in claim 9,
wherein the flange is comprises two equally configured and coaxially arranged flange parts;
wherein the first hollow shaft is connected to a first flange part; and
wherein the second hollow shaft is connected to the second flange part.

18. The shaft as defined in claim 17, wherein the two flange parts are are positive-lock connected to each other.

* * * * *

UNITED STATES PATENT AND TRADEMARK OFFICE
CERTIFICATE OF CORRECTION

PATENT NO. : 9,028,333 B2  
APPLICATION NO. : 13/820833  
DATED : May 12, 2015  
INVENTOR(S) : Lutz Page 1 of 1

It is certified that error appears in the above-identified patent and that said Letters Patent is hereby corrected as shown below:

In the Claims,

In Column 5, line 55 (Line 7 in Claim 1), please delete: "of one end".

Signed and Sealed this
Eighth Day of September, 2015

Michelle K. Lee
*Director of the United States Patent and Trademark Office*